US008244591B2

(12) United States Patent
Bagwell et al.

(10) Patent No.: US 8,244,591 B2
(45) Date of Patent: Aug. 14, 2012

(54) ACCOUNTING FOR SPATIAL AND ENVIRONMENTAL FACTORS IN EQUIPMENT ORDER CONFIGURATIONS

(75) Inventors: Derek P. Bagwell, Rochester, MN (US); Eugene K. Jurrens, Punta Gorda, FL (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/966,112

(22) Filed: Dec. 28, 2007

(65) Prior Publication Data

US 2009/0171803 A1 Jul. 2, 2009

(51) Int. Cl.
*G06Q 30/00* (2006.01)
(52) U.S. Cl. .................................... 705/26.1; 705/27.1
(58) Field of Classification Search .................. 705/26, 705/27
See application file for complete search history.

(56) References Cited

U.S. PATENT DOCUMENTS

| 6,470,301 | B1 | 10/2002 | Barral |
| 6,785,805 | B1* | 8/2004 | House et al. ................ 713/1 |
| 6,938,242 | B2 | 8/2005 | Limousin et al. |
| 6,968,298 | B2 | 11/2005 | Lohmann et al. |
| 7,006,990 | B2* | 2/2006 | Stolze et al. ................. 705/26.8 |
| 7,020,586 | B2 | 3/2006 | Snevely |
| 7,139,685 | B2 | 11/2006 | Bascle et al. |
| 7,472,043 | B1* | 12/2008 | Low et al. ........................ 703/1 |
| 2002/0073001 | A1* | 6/2002 | Palmer et al. .................. 705/29 |
| 2003/0061238 | A1* | 3/2003 | Atkinson ................... 707/104.1 |
| 2006/0020629 | A1* | 1/2006 | Ramani et al. ............. 707/104.1 |
| 2006/0178864 | A1* | 8/2006 | Khanijo et al. ................ 703/20 |

OTHER PUBLICATIONS

Kempfer, Lisa; "Rising SEA tide lifts engineering sales," Computer-Aided Engineering, Aug. 1999, v18n8p. 32; Dialog file 15 #01863752, 7pgs.*

* cited by examiner

*Primary Examiner* — Robert M. Pond
(74) *Attorney, Agent, or Firm* — Steven M. Greenberg, Esq.; Carey, Rodriguez, Greenberg & O'Keefe

(57) ABSTRACT

A method for processing an incoming order for equipment can be provided. A plurality of objects representing environmental factors is read, each object comprising at least one of a required parts list and an excluded parts list. Next, a customer places an order for computer equipment, wherein the order comprises a list of parts. A list of environmental factors is entered by the customer and the list of environmental factors is matched to at least one of the objects. The method can further include comparing the list of parts of the order to the required parts list and/or the excluded parts list of the at least one object. Finally, a record that the order is validated is stored if the list of parts of the order is consistent with the required parts list and/or the excluded parts list of the at least one object.

20 Claims, 2 Drawing Sheets ously overlooked when customer orders are processed, although these restrictions may have significant impact on the parts/subassemblies selected in the configuration.
ACCOUNTING FOR SPATIAL AND ENVIRONMENTAL FACTORS IN EQUIPMENT ORDER CONFIGURATIONS

BACKGROUND OF THE INVENTION

1. Field of the Invention

The present invention relates to commercial ordering processes, and more particularly to improved methods for processing commercial orders using higher levels of detail.

2. Description of the Related Art

Complex commercial computer systems, as well as other types of equipment, are available in a wide variety of configurations. When ordering complex commercial computer systems, customers are typically provided with a choice of various configurations, including a choice of brand, processor, memory, software, peripheral components and other customizations so as to provide the customer with a product that satisfies his needs as precisely as possible. Environmental and spatial factors of the customer, however, are variables that are commonly overlooked when customer orders are processed, although these restrictions may have significant impact on the parts/subassemblies selected in the configuration.

Often, complex computer systems arrive at a customer's facility only to find that the computer system cannot operate in the customer's weather conditions or the computer system is too tall for the ceiling height of the customer's office, for example. An ordered complex computer system may meet the needs of the customer, but if the computer system cannot fit into the customer's office, the customer's needs cannot be met. Also, there may be situations where the systems ordered are installed in airborne or water borne vehicles/spaces or other mobile platforms where additional specifications must be met in order to ensure mechanical and functional stability. In these cases, the customer has no option but to return the ordered computer system to the seller and either exchange it for a more appropriate computer system or request a refund. These situations can cause delays for the customer, cause backups in the seller's order and delivery departments and affect the reported earnings of the seller. Further, the process of exchanging or returning a complex computer system can be time-consuming and labor intensive for both buyer and seller, thereby causing the expenditure of resources for both parties.

Therefore, there is a need for a more efficient way of processing customer orders for complex computer systems so as to better accommodate the customer's environmental factors.

BRIEF SUMMARY OF THE INVENTION

Embodiments of the present invention address deficiencies of the art with respect to commercial order processing and provide a novel and non-obvious method, computer system and computer program product for processing commercial orders using a great level of detail regarding customer restrictions. In one embodiment of the invention, a method for processing an incoming order for equipment can be provided. The method can include reading a plurality of objects representing environmental limitations, each object comprising at least one of a list of required parts and a list of excluded parts and receiving an order for equipment from the customer, wherein the order comprises a list of parts. The method can further include receiving a list of environmental factors from the customer and matching the list of environmental limitations from the customer to at least one of the plurality of objects. The method can further include comparing the list of parts of the order to the list of required parts and/or list of excluded parts of the at least one of the plurality of objects. The method can further include storing a record that the order is validated, if the list of parts of the order is consistent with the list of required parts and/or list of excluded parts of the at least one of the plurality of objects.

In another embodiment of the invention, a computer system for processing an incoming order for computer equipment is provided. The computer system includes a memory for storing a plurality of objects representing environmental factors, each object comprising at least one of a list of required parts and a list of excluded parts. The computer system further includes a receiver for receiving an order for equipment from the customer, wherein the order comprises a list of parts and receiving a list of environmental factors from the customer. The computer system further includes a processor configured for matching the list of environmental factors from the customer to at least one of the plurality of objects, comparing the list of parts of the order to the list of required parts and/or list of excluded parts of the at least one of the plurality of objects, and storing a record that the order is validated, if the list of parts of the order is consistent with the list of required parts and/or list of excluded parts of the at least one of the plurality of objects.

In another embodiment of the invention, a computer program product comprising a computer usable medium embodying computer usable program code for processing an incoming order for equipment can be provided. The computer program product can include computer usable program code for reading a plurality of objects representing environmental factors, each object comprising at least one of a list of required parts and a list of excluded parts and computer usable program code for receiving an order for equipment from the customer, wherein the order comprises a list of parts. The computer program product can further include computer usable program code for receiving a list of environmental factors from the customer and computer usable program code for matching the list of environmental factors from the customer to at least one of the plurality of objects. The computer program product can further include computer usable program code for comparing the list of parts of the order to the list of required parts and/or list of excluded parts of the at least one of the plurality of objects. The computer program product can further include computer usable program code for storing a record that the order is validated, if the list of parts of the order is consistent with the list of required parts and/or list of excluded parts of the at least one of the plurality of objects.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
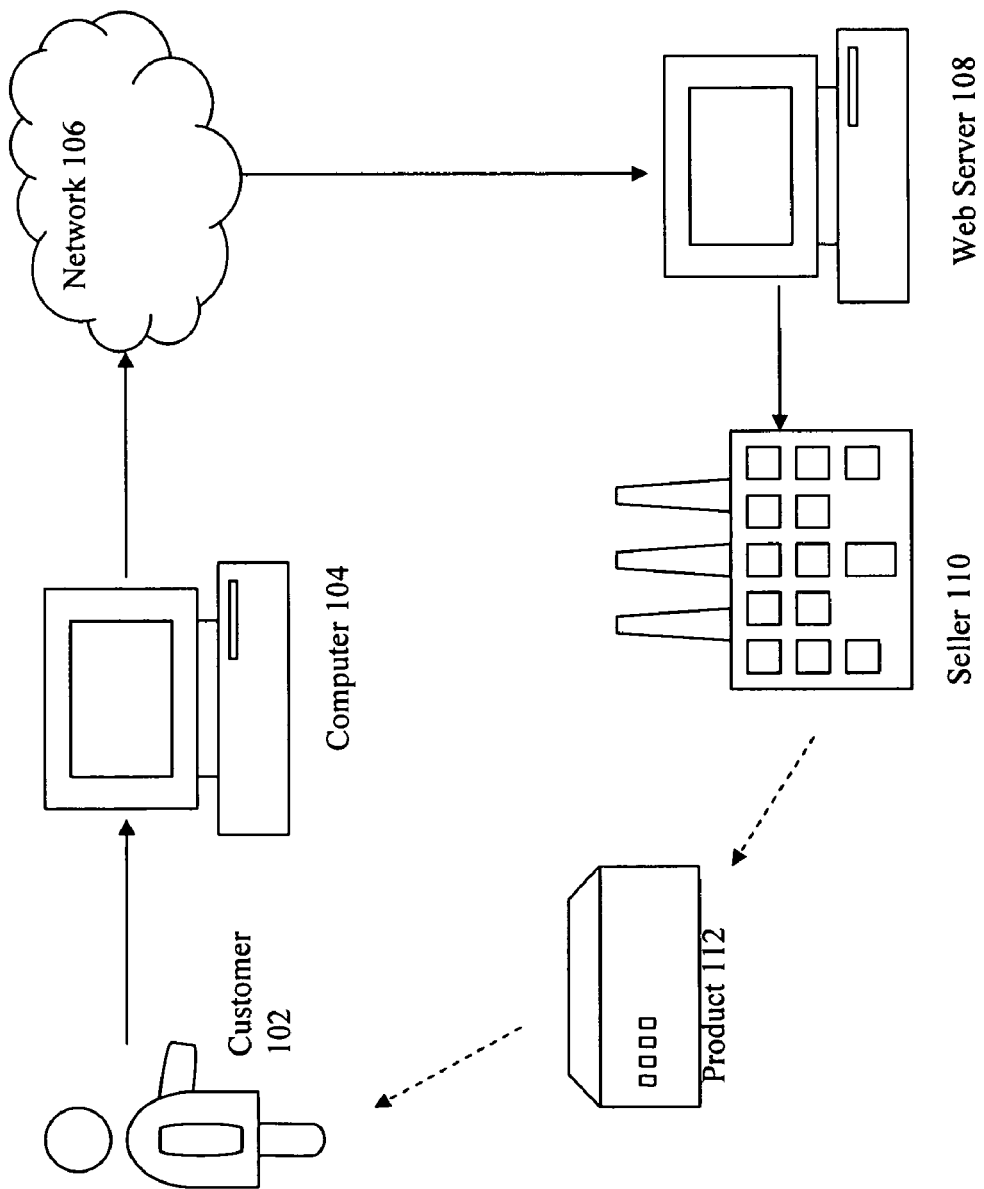
FIG. 1 is a block diagram illustrating a network architecture for a commercial ordering system, according to one embodiment of the present invention.

FIG. 1 is a block diagram illustrating a network architecture for a commercial ordering system, according to one embodiment of the present invention. FIG. 1 shows a customer 102 interacting with a computer 104 to access a network 106, such as the World Wide Web. The computer 104 may be a personal computer, a server, a workstation, a smart phone, or a personal digital assistant. Also connected to the network 106 is a web server 108 for the seller 110, which may sell complex computer systems, various types of equipment or any system of related parts with characteristics or attributes interdependent with each other and the environment within which they will be collectively installed or integrated. Web server 108 may be any commercially available web server, such as the IBM HTTP Server available from International Business Machines, Corp. of Armonk, N.Y.

According to FIG. 1, customer 102 executes a client application, such as a web browser, on computer 104 to access web server 108 for the seller 110 via a network 106. The user (customer) 102 may make selections for ordering a complex computer system, various equipment or the like and enter additional information, such as environmental restrictions, into his client application, thereby producing an order with seller 110 via the web server 108. The process by which the order is processed by the seller 110 is provided in greater detail below with reference to FIG. 2. Subsequent to the processing of the order of customer 102, the seller 110 produces a product 112 corresponding to the order and the product 112 is shipped to the customer 102.

An environmental factor can be a spatial limitation of the customer's target environment for the ordered equipment, which describes the location in which the ordered equipment shall be installed. A spatial limitation may be provided as a measurement description of a room or area, a measurement description of the doorways of a room or building, a ceiling height measurement, a floor plan, a floor load measurement, a floor level description (i.e., ground floor, second floor, etc.), a loading dock measurement description, or a wall/floor material description. An environmental factor can further be provided as a description of a platform on which the ordered equipment will be installed, such as a ship, an aircraft, an automobile, an off-shore oil rig, a submarine, a space ship, a military vehicle, underground, under sea, a space station, or on another planet. An environmental factor can further be provided as a description of temperature, humidity, special armor requirements, special power requirements, atmospheric pressure (e.g., installed at great depth or great altitude) or an earthquake prone area.

Figure 2:
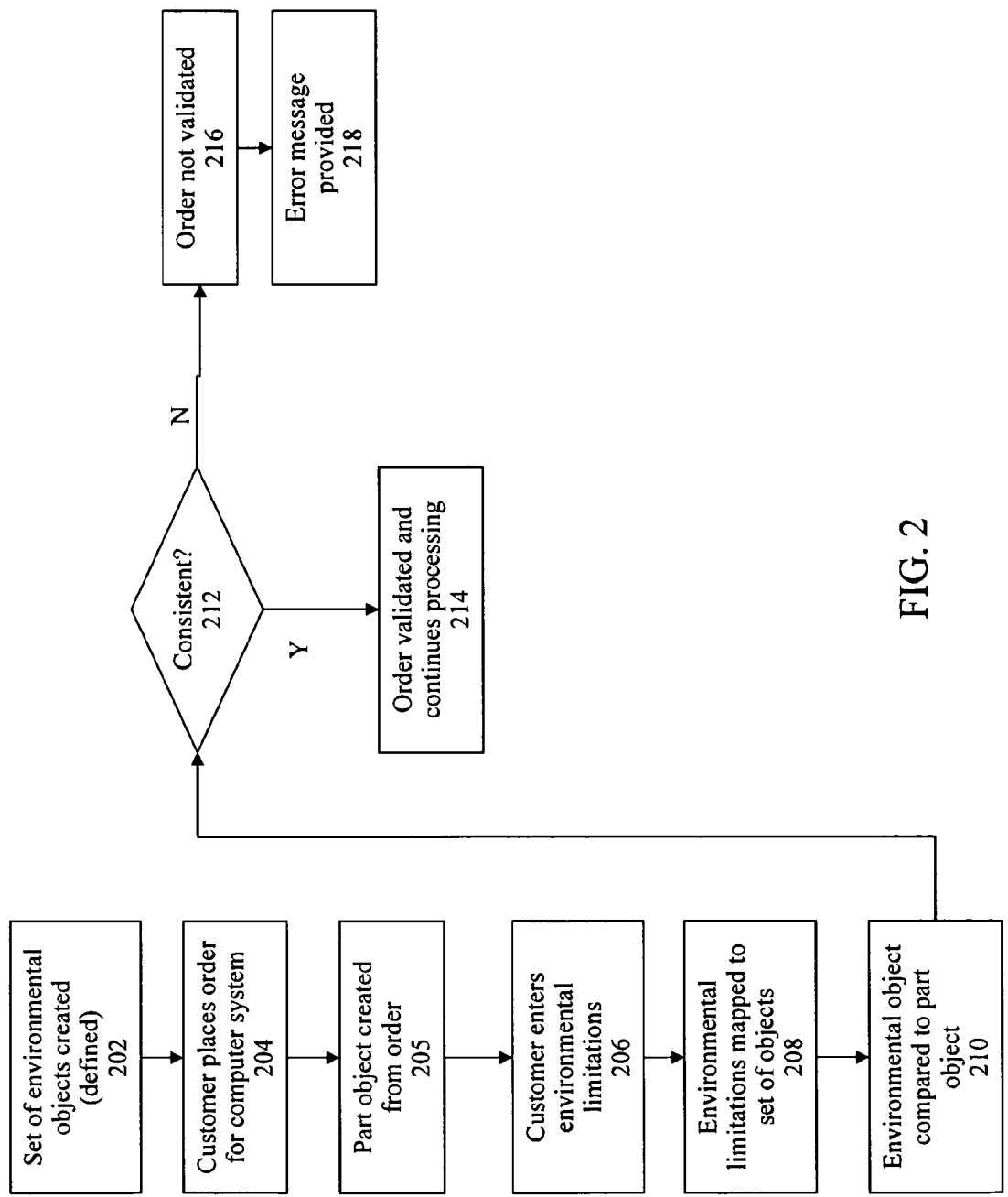
FIG. 2 is a flow chart depicting a general process for processing incoming orders, according to one embodiment of the present invention.

FIG. 2 is a flow chart depicting a general process for processing incoming orders, according to one embodiment of the present invention. FIG. 1 provides more detail regarding the process by which an order is processed by the seller 110, as first described above with reference to FIG. 2.

In a first step 202, a plurality of environmental objects are created by an entity of the seller 110, such as a program executing on the web server 108 or another computer system of seller 110. An environmental object represents one or more environmental factors (as described above), as well as the requirements and exclusions of the environmental factor.

In one embodiment of the present invention, each of the plurality of environmental objects may be represented by a computer programming object, a language mechanism for binding data with methods that operate on that data. In the computer programming paradigm of object-oriented programming, an object is the individual run-time unit that is used as the basic building block of programs. A class is a programming language construct used to group related fields and methods. A class is a cohesive package that consists of a particular kind of metadata. It describes the rules by which objects behave; these objects are referred to as instances of that class. A class has both an interface and a structure. The interface describes how the class and its instances are allowed to interact via valid methods, while the structure describes how the data is partitioned into fields within an instance.

In an embodiment of the present invention, an environmental object may comprise an object class indicator, such as "weather," that indicates the type of object. The environmental object may further comprise an object name indicator, such as "humid" that indicates a sub-type (instance) of the class. The environmental object may further comprise a list of attributes with accompanying attribute values, such as a "humidity range" attribute with a defined value of 60-75 percent humidity.

Another example of an attribute with accompanying attribute values is a "prerequisites" attribute that indicates the computer parts that are necessary or required for a computer system to function properly in the environment described by the environmental object. The accompanying attribute values to this attribute may be part numbers, model numbers or other identifiers of the required parts that possess the required physical, electrical or mechanical characteristics consistent with the necessary attributes. Yet another example of an attribute is an "excludes" attribute that indicates the computer parts that cannot function properly in the environment described by the environmental object and are therefore excluded. The accompanying attribute values to this attribute may also be part numbers, model numbers or other identifiers of the required parts. Yet another example of an attribute is a "compatible products" attribute that indicates the computer parts that are compatible with a computer system so as to function properly in the environment described by the environmental object. The accompanying attribute values to this attribute may also be part numbers, model numbers or other identifiers of the required parts.

Using the attributes described above, various if-then rules can effectively be implemented. For example, the if-then rule "if the room height is less than 9 feet, then use short cabinets" can be implemented using an environmental object having an object class indicator of "IT storage" and an object name indicator of "9 foot ceiling." Further, a prerequisites attribute value would be set to "short cabinet" or a part number for a short cabinet. In another example, the if-then rule "if the cabinet is not mounted on the ground floor, then use the anchor bolts for extra stability" can be implemented using an environmental object having an object class indicator of "floor level" and an object name indicator of "on upper floor." Further, a prerequisites attribute value would be set to "anchor bolts" or a part number for an anchor bolt.

In another example, the if-then rule "if the system will be installed on a ship, then stabilization gyros are required and corrosion protected cabinets are needed" can be implemented using an environmental object having an object class indicator of "installation platform" and an object name indicator of "ship." Further, a first prerequisites attribute value would be set to "stabilization gyros" or a part number for stabilization gyros, and a second prerequisites attribute value would be set to "corrosion protected cabinets" or a part number for corrosion protected cabinets.

Returning to FIG. 2, in step 204 the customer 102 makes selections on a client application, such as a web browser, so as to place an order for a complex computer system, various equipment or the like with the seller 110. Although the present invention is directed to orders for complex computer systems, various types of equipment or any interrelated parts, for exemplary purposes the order discussed with regard to FIG. 2 shall be an order for a complex computer system. The selections provided to the customer 102 allow the customer 102 to select components, parts, entire systems and different configurations of the aforementioned. Each of the selections has a predefined "part" object associated with it.

In step 205, a predefined "part" object corresponding to the computer part or system selected by the customer in step 204 is selected. In an embodiment of the present invention, a part object may comprise an object class indicator, such as "cabinet," that indicates the type of object. The part object may further comprise an object name indicator, such as "3400" that indicates a sub-type or model number of the object. The part object may further comprise a list of attributes with accompanying attribute values, such as a part number attribute (that provides a number for the part described), a prerequisites attribute (that describes the required components for the part to operate or to be successfully installed), an excludes attribute (that describes the components that cannot be included with the part), an applicable product attribute (that describes the components that are compatible with the part) and a not-compatible attribute (that describes the components that are not compatible with the part).

In step 206, the customer 102 may enter the environmental factors particular to his location. This may be done via a web browser or other mechanism similar to the placement of an order in step 204. As explained above, an environmental factor can be a spatial limitation of the customer, a description of a platform on which the complex computer system will be installed, a description of temperature, humidity, special armor requirements, special power requirements or other special environmental attributes such as atmospheric pressure or those necessary for an earthquake prone area.

In step 208, the environmental factors entered by the customer 102 are mapped to an object from the plurality of environmental objects described in step 202. Step 208 comprises finding an object in the plurality of environmental objects that best matches the environmental factors entered by the customer 102. This matching step may be executed by reviewing the values of the environmental factors entered by the customer 102 and searching for those values in the plurality of environmental objects. The object that possesses all of the values of the environmental factors entered by the customer 102 is taken as the matching object. If all the values of the environmental factors entered by the customer 102 are not found in one of the objects, the best match, or the object with the highest number of matching values, is taken as the matching object.

In step 210, the matching environmental object, which represents the environmental factors entered by the customer 102, are compared to the part object selected in step 205. In this step, any attributes of the environmental object that describe parts that are required or excluded (such a prerequisites attribute, an excludes attribute, a compatibility attribute, a non-compatibility attribute, and an applicable product attribute, as described above), are read.

Next, the read attributes are compared to the parts enumerated in the part object selected in step 205 and inconsistencies are meted out. For example, if an attribute of the environmental object defines a part number "450" as a required part, then the part number "450" is sought in the part object. If the part is found, then the order is valid so far. Otherwise, the order is not valid. In another example, if an attribute of the environmental object defines a part number "460" as an excluded part, then the part number "460" is sought in the part object. If the part is found, then the order is not valid. Otherwise, the order is valid. In another alternative, the parts excluded using an excludes attribute can affect the choices provided to the user 102 when making selections in step 204, such that the excluded parts are not provided as a choice.

In step 212, it is determined whether the order placed by customer 102 is consistent with the matching environmental object, according to the comparison of step 210 above. If the result of the determination of step 212 is positive, i.e., the order is consistent, then control flows to step 214. If the result of the determination of step 212 is negative, i.e., the order is not consistent, then control flows to step 216. In step 214, the order is validated and the order continues to be processed. In step 216, the order is not validated due to the inconsistencies found during the comparison of step 210. In step 218, an error message detailing the invalidity of the order is provided to the customer 102 and/or the seller 110.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, offerings that include other services and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Examples of a propagation medium include a wireless transmission and receipt from one computer-readable medium to another.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for processing an incoming order for equipment, comprising:
   reading a plurality of objects representing environmental factors, each object comprising at least one of a list of required parts and a list of excluded parts;
   receiving an order for equipment from the customer, wherein the order comprises a list of parts;
   receiving a list of environmental factors from the customer;
   matching the list of environmental factors from the customer to at least one of the plurality of objects;
   comparing the list of parts of the order to the list of required parts and/or list of excluded parts of the at least one of the plurality of objects; and
   storing a record that the order is validated, if the list of parts of the order is consistent with the list of required parts and/or list of excluded parts of the at least one of the plurality of objects.

2. The method of claim 1, further comprising:
   storing a record that the order is not validated, if the list of parts of the order is not consistent with the list of required parts and/or list of excluded parts of the at least one of the plurality of objects.

3. The method of claim 2, wherein the step of receiving an order further comprises:
   prompting the user to enter an order for equipment via a web page; and
   receiving an order for equipment from the customer via the web page, wherein the order comprises a list of parts.

4. The method of claim 3, wherein the step of receiving a description further comprises:
   prompting the user to enter a list of environmental factors of the customer via a web page; and
   receiving a list of environmental factors from the customer via the web page.

5. The method of claim 4, wherein the step of comparing further comprises:
   comparing the list of parts of the order to the list of required parts and/or list of excluded parts of the at least one of the plurality of objects so as to determine whether parts in the list of required parts are present in the at least one of the plurality of objects and/or whether parts in the list of excluded parts are not present in the at least one of the plurality of objects.

6. The method of claim 5, wherein the step of storing a record that the order is validated further comprises:
   storing a record that the order is validated, if parts in the list of required parts are present in the at least one of the plurality of objects and/or parts in the list of excluded parts are not present in the at least one of the plurality of objects.

7. The method of claim 6, wherein the step of storing a record that the order is not validated further comprises:
   storing a record that the order is not validated, if parts in the list of required parts are not present in the at least one of the plurality of objects and/or parts in the list of excluded parts are present in the at least one of the plurality of objects.

8. A computer program product comprising a computer usable storage medium storing computer usable program code that when executed in memory of a computer processes an incoming order for equipment, the computer program product comprising:
   computer usable program code for reading a plurality of objects representing environmental factors, each object comprising at least one of a list of required parts and a list of excluded parts;
   computer usable program code for receiving an order for equipment from the customer, wherein the order comprises a list of parts;
   computer usable program code for receiving a list of environmental factors from the customer;
   computer usable program code for matching the list of environmental factors from the customer to at least one of the plurality of objects;
   computer usable program code for comparing the list of parts of the order to the list of required parts and/or list of excluded parts of the at least one of the plurality of objects; and
   computer usable program code for storing a record that the order is validated, if the list of parts of the order is consistent with the list of required parts and/or list of excluded parts of the at least one of the plurality of objects.

9. The computer program product of claim 8, further comprising:
   computer usable program code for storing a record that the order is not validated, if the list of parts of the order is not consistent with the list of required parts and/or list of excluded parts of the at least one of the plurality of objects.

10. The computer program product of claim 9, wherein the computer usable program code for receiving an order further comprises:
    computer usable program code for prompting the user to enter an order for equipment via a web page; and
    computer usable program code for receiving an order for equipment from the customer via the web page, wherein the order comprises a list of parts.

11. The computer program product of claim 10, wherein the computer usable program code for receiving a description further comprises:
    computer usable program code for prompting the user to enter a list of environmental factors of the customer via a web page; and
    computer usable program code for receiving a list of environmental factors from the customer via the web page.

12. The computer program product of claim 11, wherein the computer usable program code for comparing further comprises:
    computer usable program code for comparing the list of parts of the order to the list of required parts and/or list of excluded parts of the at least one of the plurality of objects so as to determine whether parts in the list of required parts are present in the at least one of the plurality of objects and/or whether parts in the list of excluded parts are not present in the at least one of the plurality of objects.

13. The computer program product of claim 12, wherein the computer usable program code for storing a record that the order is validated further comprises:
    computer usable program code for storing a record that the order is validated, if parts in the list of required parts are present in the at least one of the plurality of objects and/or parts in the list of excluded parts are not present in the at least one of the plurality of objects.

14. The computer program product of claim 13, wherein the computer usable program code for storing a record that the order is not validated further comprises:

computer usable program code for storing a record that the order is not validated, if parts in the list of required parts are not present in the at least one of the plurality of objects and/or parts in the list of excluded parts are present in the at least one of the plurality of objects.

15. A computer system for processing an incoming order for equipment, comprising:
a memory for storing a plurality of objects representing environmental factors, each object comprising at least one of a list of required parts and a list of excluded parts;
a receiver for receiving an order for equipment from the customer, wherein the order comprises a list of parts and receiving a list of environmental factors from the customer; and
a processor configured for:
matching the list of environmental factors from the customer to at least one of the plurality of objects;
comparing the list of parts of the order to the list of required parts and/or list of excluded parts of the at least one of the plurality of objects; and
storing a record that the order is validated, if the list of parts of the order is consistent with the list of required parts and/or list of excluded parts of the at least one of the plurality of objects.

16. The computer system of claim 15, wherein the processor is further configured for:
storing a record that the order is not validated, if the list of parts of the order is not consistent with the list of required parts and/or list of excluded parts of the at least one of the plurality of objects.

17. The computer system of claim 16, further comprising:
a transmitter for transmitting a record that the order is validated or a record that the order is not validated.

18. The computer system of claim 17, wherein the transmitter comprises a web server that provides a web page to the customer including a record that the order is validated or a record that the order is not validated.

19. The computer system of claim 16, wherein the receiver comprises a web server that provides a web page to the customer for entering information.

20. The computer system of claim 16, wherein the list of environmental factors comprises at least one of a spatial description, a range of temperatures, a weather description, a platform description, and an available power description.

* * * * *